United States Patent [19]

Wong

[11] Patent Number: 4,598,293
[45] Date of Patent: Jul. 1, 1986

[54] RADAR OR SONAR DETECTION SYSTEM

[75] Inventor: Andrew C. Wong, Harlow, England

[73] Assignee: International Standard Electric Corporation, New York, N.Y.

[21] Appl. No.: 737,905

[22] Filed: May 24, 1985

Related U.S. Application Data

[63] Continuation of Ser. No. 438,217, Nov. 1, 1982, abandoned.

[30] Foreign Application Priority Data

Nov. 12, 1981 [GB] United Kingdom ............... 8134090

[51] Int. Cl.⁴ ..................... G01S 13/00; G01S 7/28; G01S 9/68
[52] U.S. Cl. .......................... 343/17.2 R; 343/5 PD; 367/101; 367/93
[58] Field of Search ............... 367/93, 100, 101, 135, 367/136; 343/17.1 R, 17.2 PC, 17.5, 5 PD, 7.3, 7.7, 17.2 R; 364/728

[56] References Cited

U.S. PATENT DOCUMENTS

| | | | |
|---|---|---|---|
| 3,167,738 | 1/1965 | Westerfield | 367/100 X |
| 3,386,095 | 5/1968 | Stevens | 343/7.7 X |
| 3,550,125 | 12/1970 | Fierston et al. | 343/17.1 R X |
| 3,614,785 | 10/1971 | Kratzer | 343/7.7 |
| 3,882,494 | 5/1975 | Bolger | 343/7.7 X |
| 3,967,283 | 6/1976 | Clark et al. | 343/17.2 PC X |
| 4,028,700 | 6/1977 | Carey et al. | 343/17.2 PC |
| 4,070,673 | 1/1978 | Schmidt et al. | 343/17.1 R X |
| 4,097,844 | 6/1978 | Moyer | 364/728 X |
| 4,121,297 | 10/1978 | Smith | 364/728 |
| 4,414,641 | 11/1983 | Jarret | 364/728 |

FOREIGN PATENT DOCUMENTS

0642713 1/1979 U.S.S.R. ............... 367/100

OTHER PUBLICATIONS

W. B. Allen and E. C. Westerfield, Digital Compressed Time Correlators and Matched Filters for Active Sonar, Journal Acoustic Society America, vol. 36, No. 1, Jan. 1964, pp. 121-139.

Primary Examiner—Charles T. Jordan
Assistant Examiner—Brian S. Steinberger
Attorney, Agent, or Firm—John T. O'Halloran; Thomas F. Meagher

[57] ABSTRACT

An intruder detector system employing Doppler radar consists of an encoder for modulating RF pulses with a cyclic pulse code, the code being cycled at a frequency equal to the RF pulse frequency and the pulses being modulated on a VHF carrier for transmission along one of a pair of parallel radiating cables. The signal received from the other cable is demodulated and digitized by a zero crossing detector functioning as a 1-bit analog-to-digital converter. A bank of exclusive-OR gates functioning as 1-bit correlators then simultaneously correlates each successive bit of the digitized signal with the values of the respective bits in each fixed position of the transmitted code sequence.

2 Claims, 1 Drawing Figure

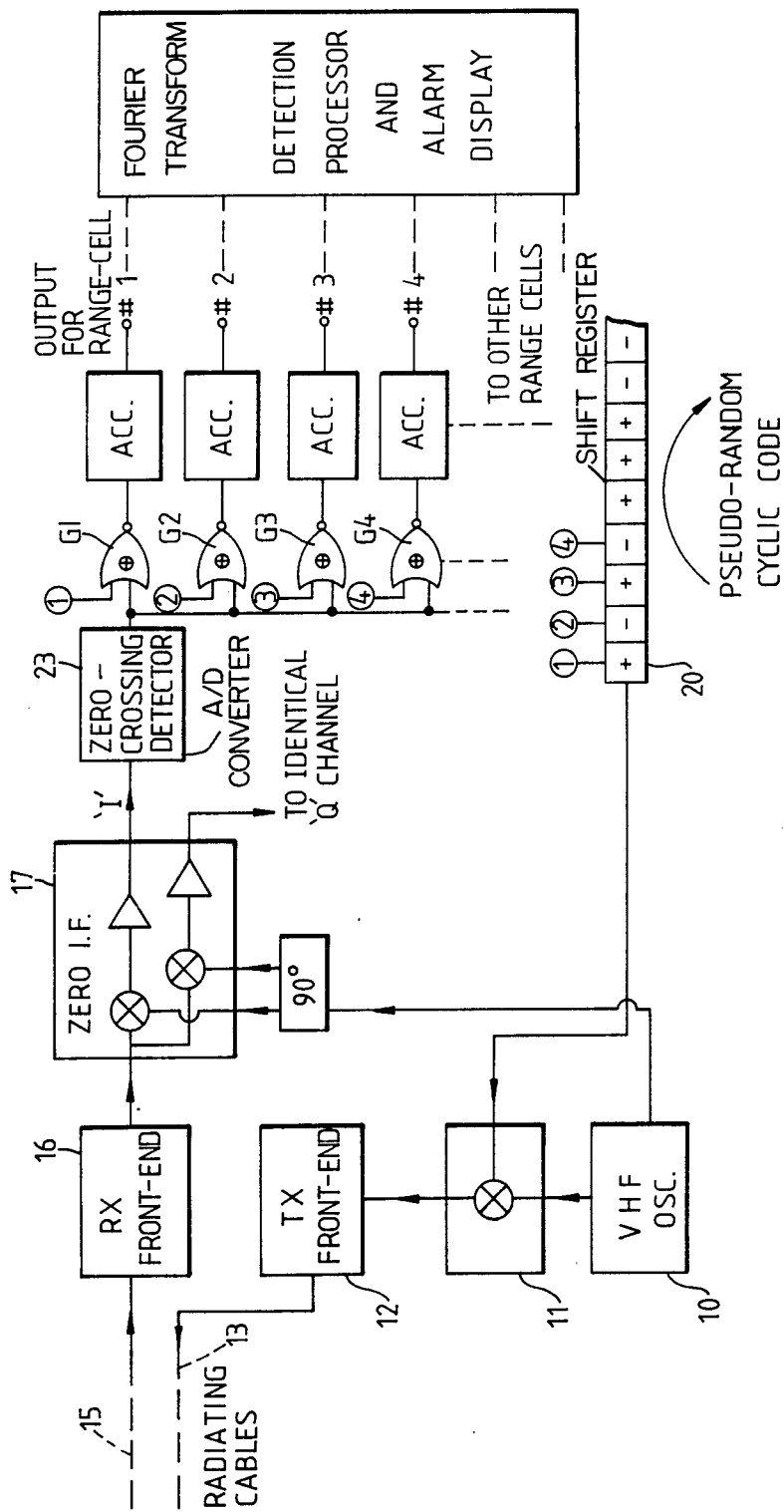

RADAR OR SONAR DETECTION SYSTEM

This application is a continuation of application Ser. No. 438,217, filed Nov. 1, 1982, now abandoned.

BACKGROUND OF THE INVENTION

The present invention relates to a radar or sonar detection system such as may be used for instance for intruder detection in guarding the perimeter of an area.

In our British application No. 8013259 we have described an intruder detection system in which RF pulses are modulated on a VHF carrier, each RF pulse being modulated with a pseudo-random pulse code sequence and the carrier being transmitted along a length of radiating cable. Signals received from the cable, for example, along a second length of cable disposed substantially parallel to the first length of cable, are correlated with replicas of the code sequence, the replicas being generated under control of a range delay circuit so that the presence of a return signal within a given range cell is detected. The range delay circuit may be arranged so that either a sequence of range cells is cyclically monitored, or a set of parallel code mixers can be used for different range cells so that the signals from all range cells are processed simultaneously.

However, experience with the conventional system has shown that it is rather complicated and, consequently, expensive.

SUMMARY OF THE INVENTION

Accordingly, it is a general object of the present invention to avoid the disadvantages of the prior art.

More particularly, it is an object of the invention to provide a radar or sonar detection system in which the disadvantages of the conventional systems of this type are avoided.

Still another object of the present invention is so to construct the system of the type here under consideration as to reduce the complexity of the receiving and processing circuitry as compared to the conventional system, while still maintaining simultaneous correlation of all range cells.

In pursuance of these objects and others which will become apparent hereafter, one feature of the present invention resides, in a radar or sonar system, in a combination comprising a transmitter including an encoder for modulating a carrier with a cyclic pulse code which is cycled at a frequency equal to the pulse repetition frequency, and a receiver including a 1-bit analog-to-digital converter for digitizing the received pulses, and a plurality of 1-bit correlators for simultaneously correlating each successive bit of the digitized signal with the values of the respective bits in each expected position of the received code sequence.

It is currently preferred to construct the 1-bit analog-to-digital converter as a zero crossing detector, and to construct each 1-bit correlator as an exclusive-OR gate.

The system may further comprise means for accumulating the respective outputs of the 1-bit correlators for the length of the code sequence, such accumulating means including a plurality of accumulators each accumulating the outputs of the respective 1-bit correlators for a predetermined number of RF pulses. It is also advantageous when each accumulator includes an up-down counter connected to receive the output of the respective 1-bit correlator.

BRIEF DESCRIPTION OF THE DRAWING

Above-mentioned and other features and objects of the invention will become more apparent by reference to the following description taken in conjunction with the sole FIGURE of the accompanying drawing which is a diagrammatic representation of the present invention as embodied in a radar or sonar detection system.

DETAILED DESCRIPTION OF THE PREFERRED EMBODIMENT

The basic operation of the system is described more fully in our aforesaid British application No. 8013259. Briefly, a VHF signal source 10 is modulated by RF pulses containing a pseudo-random pulse code sequence in a spread spectrum modulator 11, and the resulting signal is fed to a transmitter 12 for transmission along a first or radiating cable 13. Return signals are transmitted back along a second or return cable 15 and received at a receiver front end 16. The received signals are mixed with quadrature components of the transmitted VHF signal in a zero intermediate frequency unit 17 to derive sequences of D.C. pulses for I and Q channel processing.

From this point, the circuit shown in the accompanying drawing differs from that described in a British application No. 8013259. The pseudo-random cyclic code is stored in a cyclic shift register 20 and is continuously rotated at a period equal to the desired pulse repetition frequency of the system. The output from the shift register 20 is applied to the spread spectrum modulator 11 so that the successive pulses are modulated with a different code for different range cells. The number of range cells covered by the system is therefore equal to the length of the code.

Each stage of the shift register containing one bit of the pseudo-random code is also connected to a first input of a respective gate in a bank of exclusive-OR logic gates $G_1$, $G_2$, $G_3$ etc. to apply the bit then contained in the respective stage to the first input of the associated gate. The gates $G_1$, $G_2$, $G_3$ etc. are being used as 1-bit correlators.

D.C. pulses for each channel are processed separately but, for simplicity, only further processing of the I component is shown, the processing of the Q component being identical. The pulses are fed to a zero crossing detector 23 which functions as a 1-bit analog-to-digital converter. The output of the detector 23 is fed to the second input of each exclusive-OR gate so that if, for instance, the successive bits from the detector 23 match the successive bits appearing at the first input of the gate $G_3$, this will indicate the received pulses have been reflected from a target in the third range cell. The signals appearing at the outputs of the gates $G_1$, $G_2$, $G_3$ etc. are applied to respective up-down counters ACC functioning as accumulators. Code chips can thus be integrated not only for the length of the code but also for a number of the RF pulses. This accumulation of pulses prior to subsequent processing in a Fourier transform processor reduces the required size of the processor and leads to higher processing speeds.

The outputs of the various accumulators ACC are finally scanned by a detection processor to extract the information from the different range cells, and actuate an alarm display whenever a moving target is detected.

In this specification, a 1-bit digital system is defined as one in which a logical 1 represents a positive input and a logical 0 represents a negative input, or vice-versa.

It can be shown that the dynamic range of a digital system is not limited to that of the analog-to-digital conversion process in the system. With Gaussian noise present, the digital system is able to discern signals and signal changes that are smaller than the quantization step, as long as the standard deviation of the noise is significantly larger than the quantization step, and that sufficient integration is performed on the signal samples to lift the signal above the thermal and quantization noise. Such criteria can be applied to a 1-bit digital system.

While I have described above the principles of my invention in connection with specific apparatus, it is to be clearly understood that this description is made only by way of example and not as a limitation to the scope of my invention as set forth in the accompanying claims.

I claim:

1. In a radar or sonar system, a combination comprising a transmitter including an encoder for modulating a carrier prior to transmitting the same into the system with a cyclic pulse code sequence which is cycled through a predetermined number of bit positions at a frequency equal to the pulse repetition frequency, and a receiver including a 1-bit analog-to-digital converter comprising a zero-crossing detector for digitizing incoming signals received from respective range cells of the system in response to the effect of the modulated carrier thereat, and a plurality of 1-bit correlators each respectively supplied with the instantaneous value of the digitized signal from said 1-bit analog to digital converter and with the value of the bit of the code sequence then encountered at a predetermined one of said bit positions which is different for each of said correlators and corresponds to the respective range cell, wherein each 1-bit correlator comprises an exclusive-OR gate, said correlators being collectively operative for simultaneously correlating each successive bit of the digitized signal with the values of the respective bits in each expected position of the received code sequence, and a plurality of accumulators, each accumulator comprising an up-down counter connected to an output of one of said respective 1-bit correlators to accumulate the output thereof for a predetermined number of RF pulses.

2. A system according to claim 1, wherein the pulse code sequence is modulated on a carrier for transmission; and wherein said receiver includes a zero intermediate frequency unit for demodulating the received carrier to recover the pulse code sequence.

* * * * *